United States Patent
Allen et al.

(10) Patent No.: US 7,111,518 B1
(45) Date of Patent: Sep. 26, 2006

(54) EXTREMELY LOW COST PRESSURE SENSOR REALIZED USING DEEP REACTIVE ION ETCHING

(75) Inventors: Henry V. Allen, Fremont, CA (US); Stephen C. Terry, Palo Alto, CA (US); James W. Knutti, Fremont, CA (US)

(73) Assignee: Silicon Microstructures, Inc., Milpitas, CA (US)

( * ) Notice: Subject to any disclaimer, the term of this patent is extended or adjusted under 35 U.S.C. 154(b) by 0 days.

(21) Appl. No.: 10/665,991

(22) Filed: Sep. 19, 2003

(51) Int. Cl.
*G01L 7/08* (2006.01)
*G01L 9/00* (2006.01)

(52) U.S. Cl. ........................................................ 73/715
(58) Field of Classification Search ................... 73/715
See application file for complete search history.

(56) References Cited

U.S. PATENT DOCUMENTS

| | | | |
|---|---|---|---|
| 5,549,006 A * | 8/1996 | Kurtz | 73/708 |
| 6,341,528 B1 * | 1/2002 | Hoffman et al. | 73/777 |
| 6,651,506 B1 * | 11/2003 | Lee et al. | 73/718 |
| 6,874,367 B1 * | 4/2005 | Jakobsen | 73/718 |
| 2002/0100316 A1 * | 8/2002 | James et al. | 73/204.26 |
| 2003/0029245 A1 * | 2/2003 | Izadnegahdar et al. | 73/753 |

* cited by examiner

*Primary Examiner*—Max Noori
(74) *Attorney, Agent, or Firm*—J. Matthew Zigmant; Townsend and Townsend and Crew LLP

(57) ABSTRACT

Methods and apparatus for an absolute or gauge pressure sensor having a backside cavity with a substantially vertical interior sidewall. The backside cavity is formed using a DRIE etch or other MEMS micro-machining technique. One embodiment provides for a diaphragm having a boss manufactured using a two step process that results in a boss thickness that is independent of the thickness of the starting material. Another provides for various shapes to the backside cavity that reduces the likelihood of crystalline fractures while focusing stress on piezoresistive sensing elements. Another provides for a sensitivity adjustment by thinning the insulating and silicon layers that form the sensor diaphragm. A pressure sensor according to the present invention may incorporate one or more of these, or may incorporate other elements discussed herein.

25 Claims, 9 Drawing Sheets

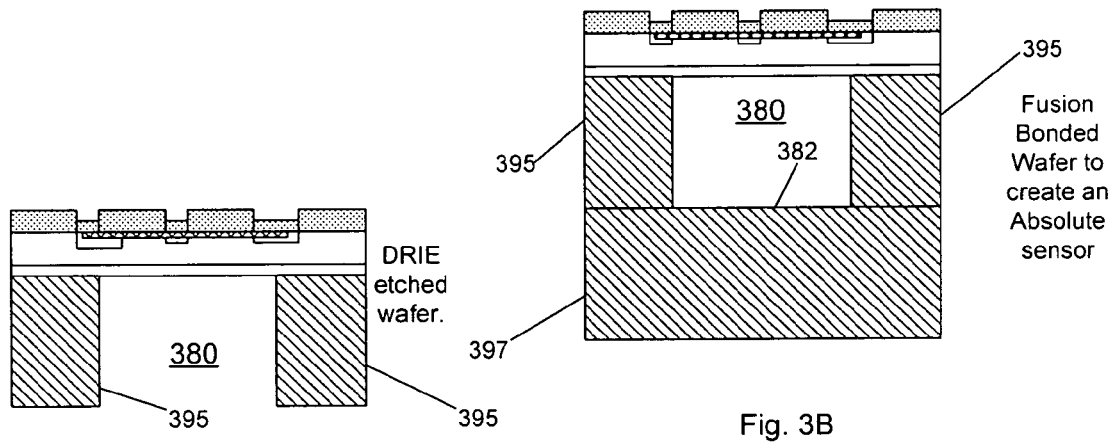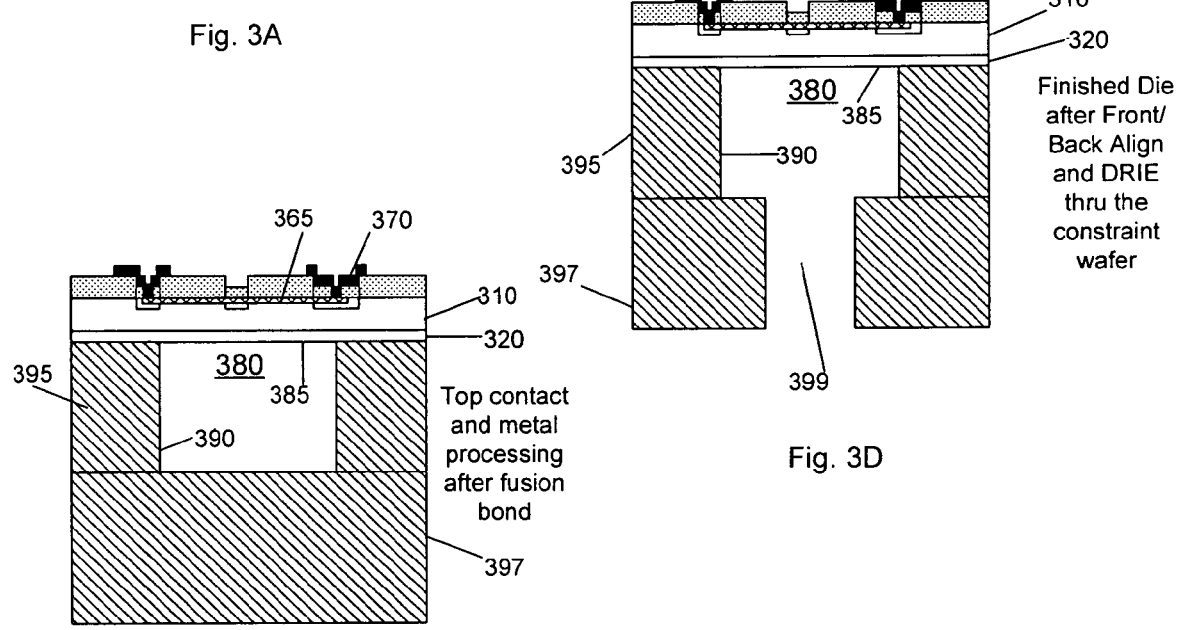

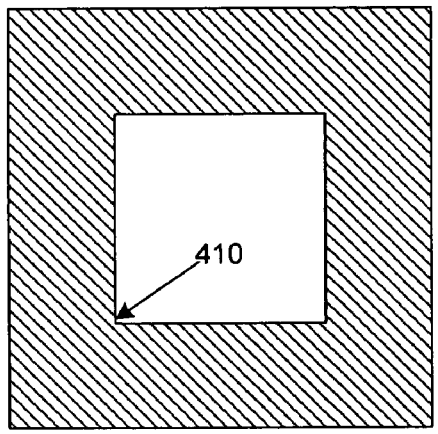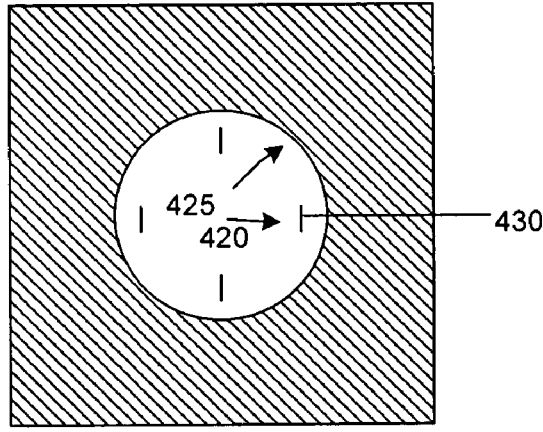
Fig. 4A                Fig. 4B
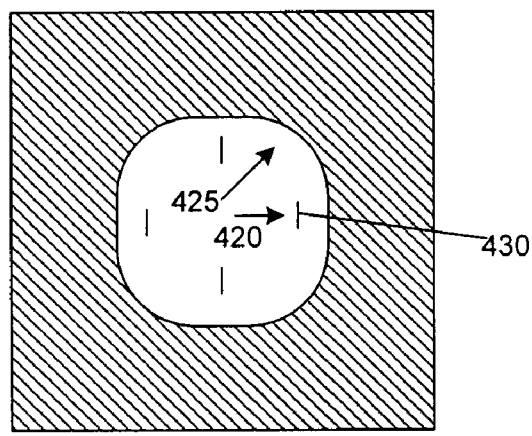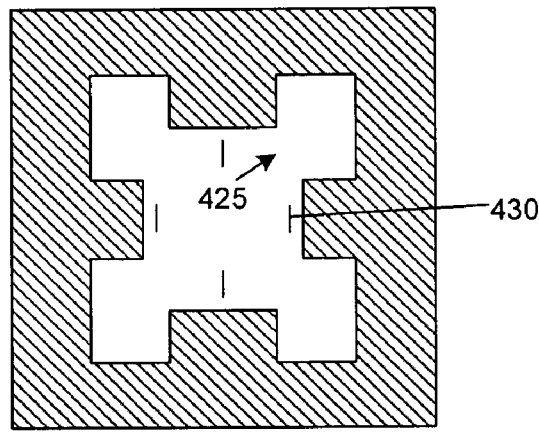
Fig. 4C                Fig. 4D

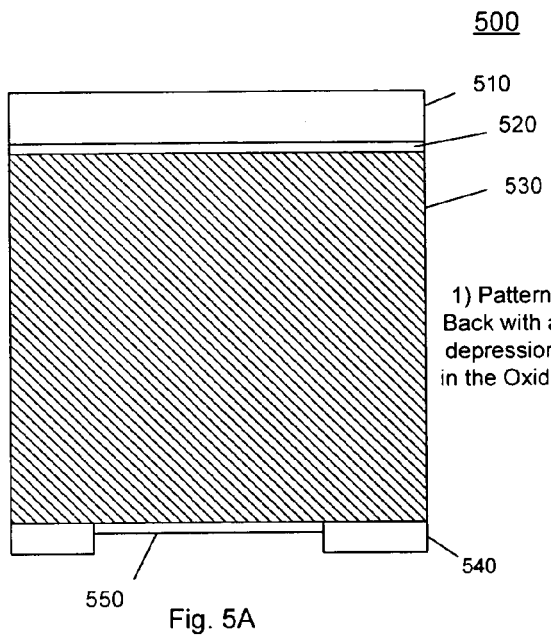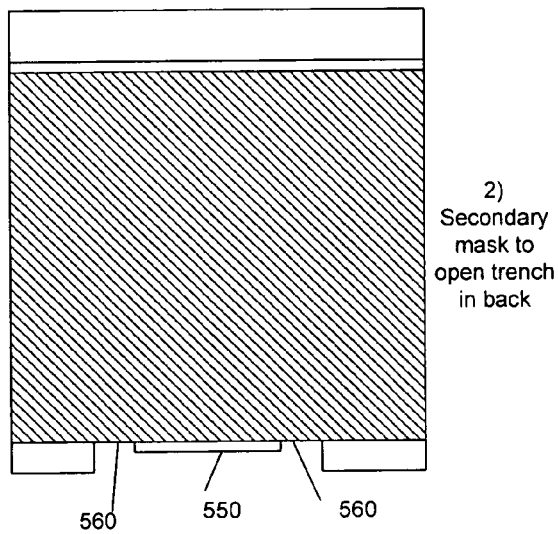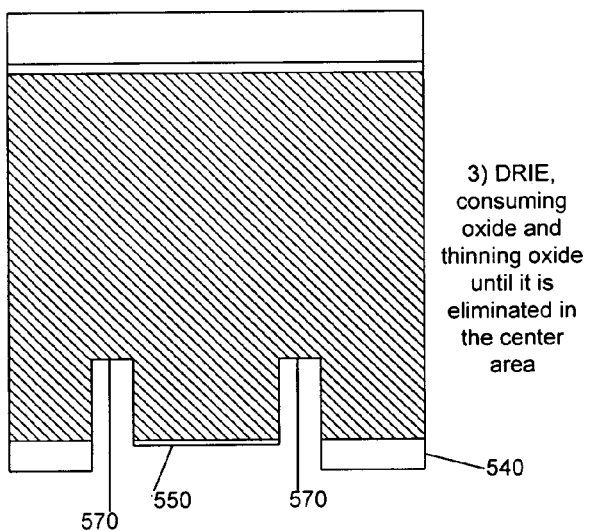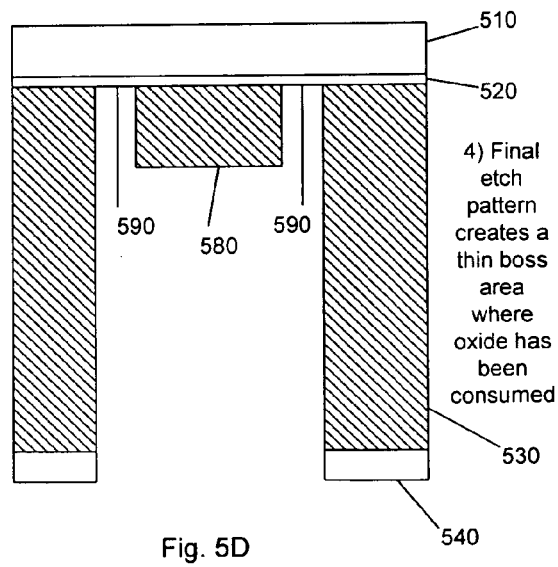

600

650

EXTREMELY LOW COST PRESSURE SENSOR REALIZED USING DEEP REACTIVE ION ETCHING

BACKGROUND

The present invention relates to the field of silicon pressure sensors, specifically pressure sensors having a frame or sidewall having an inner side that is substantially orthogonal to a pressure sensor diaphragm.

Conventional pressure sensors include a diaphragm supported by a frame or sidewall. The frame or sidewall is typically made from the same silicon block as the diaphragm, and is formed by etching a backside cavity in the silicon block.

FIG. 1 A is a cross-section of a conventional pressure sensor 100 that may be improved by incorporation of embodiments of the present invention. This pressure sensor includes a diaphragm 110 supported by a frame 120. These sensors are conventionally fabricated by selectively etching a <100> silicon wafer using KOH. Specifically, a silicon wafer or block is etched most of the way through resulting in a backside cavity 130 having a backside opening 135.

The backside cavity 130 is defined by the backside opening 135 and an inner sidewall of the frame 120, which has a slope of 54.7 degrees as dictated by the <111> crystal plane. Accordingly, for each micron of depth 125 of the cavity 130, the backside opening 135 is increased by 0.708 microns in width. For example, a 10 microns thick, thousand micron wide diaphragm in a 410 microns thick silicon wafer requires an additional length 137 equal to 283 microns for a total backside opening 135 of 1566 microns. In practice, the actual die size is even larger. This is because the sidewalls require a certain width since these die are conventionally bonded to glass or other type substrate before the die in the wafer are individualized. This additional length 127 in one example is 255 microns. In that case, using the above numbers, the actual die length becomes 2076 microns. In another example, the diaphragm length may be reduced to 250 microns. In that case, the die length is reduced to 1326 microns.

As can be seen from FIG. 1A, a large part of the length of these sensors is due to the sloped edges of the frame 120. Accordingly, if the edge of the frame 120 is made substantially vertical, the overall die length is reduced. For example, if the diaphragm length is maintained at 250 microns and the sidewall width 127 is held at 255 microns, the die length is decreased from 1326 to 760 microns. Given a 0.1 mm line width required for dicing the wafer into individual die, this length reduction means 2.75 times the number of sensors may be fabricated on a wafer. Thus, what is needed are methods and apparatus for extremely low cost pressure sensors having a frame or sidewall that is substantially orthogonal to the sensor diaphragm.

SUMMARY

Accordingly, embodiments of the present invention provide a pressure sensor having substantially vertical frame sides that are orthogonal to a sensor diaphragm such that the pressure sensor die size is dramatically reduced. These sides, the interior sidewall of a backside cavity, are formed using a Deep Reactive Ion Etch (DRIE) or other Mirco-Electro-Mechanical System (MEMS) micro-machining technique.

One embodiment provides for a boss manufactured using a two step process that results in a boss thickness that is independent of the thickness of the starting material. Another provides for various shapes to the backside cavity that reduce the likelihood of crystalline fractures while focusing stress on piezoresistive sensing elements. Yet another provides for a sensitivity adjustment by thinning the insulating and silicon layers that form the sensor diaphragm. A pressure sensor according to the present invention may incorporate one or more of these, or may incorporate other elements discussed herein.

Methods that are in accordance with the present invention may be used to manufacture either absolute or gauge sensors. Specific embodiments result in 150 mm (6 inch) silicon wafers containing approximately at least 19,000 sensors, each with a diaphragm less than 350 microns in length, and having an area greater than 10 percent of the total sensor die area. Other embodiments provide 150 mm (6 inch) silicon wafers containing over 25,000 sensors, each with a diaphragm less than 250 microns in length, and also having an area greater than 10 percent of the total sensor die area. The resulting sensors may use piezoresistive or capacitive sensing circuits.

An exemplary embodiment of the present invention provides a method of manufacturing a pressure sensor having a boss. This method includes growing a first oxide layer on a bottom of a wafer, the wafer comprising a silicon-on-insulator structure having an insulator layer between a first silicon layer and a second silicon layer, a surface of the second silicon layer forming the bottom of the wafer, selectively thinning at least one area of the first oxide layer such that a first thin-oxide area is formed, removing the oxide layer from a first portion the first thin-oxide area such that a second thin-oxide area and a first exposed silicon area are formed, and etching the bottom of the wafer such that the second silicon layer is removed above the first exposed silicon area and the second silicon layer is thinned above the second thin-oxide area, such that the boss is formed. In this exemplary embodiment the etching is a deep reactive ion etching and the removal of the second silicon layer above the first exposed silicon area creates a sidewall, the sidewall substantially orthogonal to the bottom of the wafer.

Another exemplary embodiment of the present invention provides a pressure sensor. This pressure sensor includes a horizontal diaphragm having a top and a bottom, a silicon sidewall formed using MEMS mirco-machining and extending from the bottom of the diaphragm, the sidewall having an interior side forming a backside cavity, the backside cavity having a backside opening, the interior side substantially vertical, and a boss attached to the bottom of the diaphragm, the boss separate from the sidewall.

A further exemplary embodiment of the present invention provides a method of manufacturing a pressure sensor. This method includes growing a first oxide layer on a bottom of a wafer, the wafer comprising a silicon-on-insulator structure including an insulator layer between a first silicon layer and a second silicon layer, a surface of the second silicon layer forming the bottom of the wafer, selectively removing the first oxide layer such that a first no-oxide area is formed, and etching the bottom of the wafer such that the second silicon layer is removed above the first no-oxide area. The etching is a deep reactive ion etching, the first no-oxide area is non-rectangular, and the removal of the second silicon layer above the first no-oxide area creates a sidewall, the sidewall substantially orthogonal to the bottom of the wafer.

Yet a further embodiment of the present invention provides a pressure sensor. This pressure sensor includes a diaphragm and a sidewall, the sidewall having an interior side defining a backside opening, the sidewall extending from the diaphragm to the backside opening. The interior side of the sidewall is formed using a deep reactive ion etch and is substantially orthogonal to the diaphragm, and the backside opening is non-rectangular.

Still a further embodiment of the present invention provides a method of manufacturing a pressure sensor. This method includes growing a first oxide layer on a bottom of a wafer, the wafer comprising a silicon-on-insulator structure having a buried insulator layer between a first silicon layer and a second silicon layer, a surface of the second silicon layer forming the bottom of the wafer, selectively removing the first oxide layer such that a first no-oxide area is formed, etching the bottom of the wafer such that the second silicon layer is removed between the first no-oxide area and the buried insulator layer, such that an exposed portion of the buried insulator layer is formed, and adjusting a sensitivity of the pressure sensor by thinning the exposed portion of the buried insulator layer. The etching is a deep reactive ion etching and the removal of the second silicon layer above the first no-oxide area creates a sidewall, the sidewall substantially orthogonal to the bottom of the wafer.

Another exemplary embodiment of the present invention provides an absolute pressure sensor. This pressure sensor includes a diaphragm having a top and a bottom, a sidewall extending from the bottom of the diaphragm, the sidewall having an interior side forming a backside cavity having a backside opening, the interior side substantially orthogonal to the diaphragm, and a block covering the backside opening such that a hermetic seal is formed.

Still another exemplary embodiment of the present invention provides a method of manufacturing a pressure sensor. This method includes growing a first oxide layer on a bottom of a first wafer, the first wafer comprising a silicon-on-insulator structure including an insulator layer between a first silicon layer and a second silicon layer, a surface of the second silicon layer forming the bottom of the first wafer, selectively removing the first oxide layer such that a first exposed silicon area is formed, etching the bottom of the wafer such that the second silicon layer is removed above the first exposed silicon area and a backside cavity having a backside opening is formed, attaching a second wafer to the bottom of the first wafer such that the backside opening is covered such that a hermetic seal is formed, and etching through the second wafer, such that an opening to the backside cavity is formed. The etching is a deep reactive ion etching and the removal of the second silicon layer above the first exposed silicon area creates a sidewall, the sidewall substantially orthogonal to the bottom of the first wafer.

Another exemplary embodiment of the present invention provides a silicon wafer. This silicon wafer includes a plurality of pressure sensors, each pressure sensor including a diaphragm having a top and a bottom, and a sidewall extending from the bottom of the diaphragm, the sidewall having an interior side formed using a deep reactive ion etch and forming a backside cavity having a backside opening, the interior side substantially orthogonal to the diaphragm. The plurality of pressure sensors includes approximately at least twenty-thousand pressure sensors. The wafer size in this embodiment is 150 mm (6 inches).

Yet a further exemplary embodiment of the present invention provides a pressure sensor apparatus. This apparatus includes exactly one pressure sensor in a housing, the exactly one pressure sensor including a diaphragm having a top and a bottom, and a sidewall extending from the bottom of the diaphragm, the sidewall having an interior side formed using a deep reactive ion etch and forming a backside cavity having a backside opening, the interior side substantially orthogonal to the diaphragm. In this embodiment, the diaphragm is less than 350 microns in length and it accounts for more than 10 percent of an area of the exactly one pressure sensor.

A better understanding of the nature and advantages of the present invention may be gained with reference to the following detailed description and the accompanying drawings.

BRIEF DESCRIPTION OF THE DRAWINGS

FIG. 1A is a cross-section of a conventional pressure sensor that may be improved by incorporation of embodiments of the present invention, while

FIGS. 2A–2F illustrate steps that may be followed in beginning the manufacturing a pressure sensor consistent with an embodiment of the present invention, while

FIGS. 3A–3D illustrate steps that may be followed in manufacturing either an absolute or gauge sensor in accordance with an embodiment of the present invention;

FIGS. 4A–4D illustrate patterns that may be used in etching a backside cavity;

FIGS. 5A–5F illustrate steps that may be used in forming a backside cavity and diaphragm having a boss in accordance with an embodiment of the present invention;

DESCRIPTION OF EXEMPLARY EMBODIMENTS

Figure 1A:
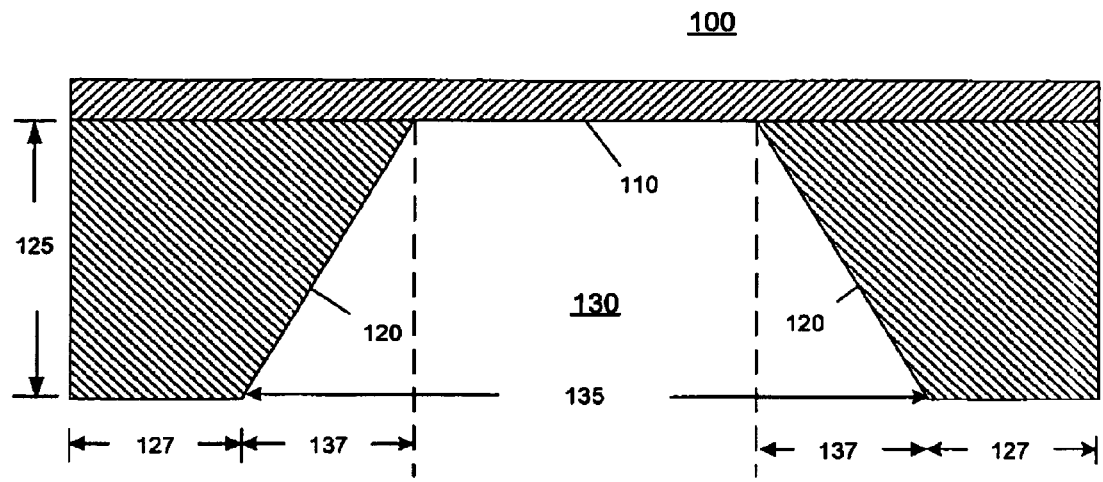
Figure 1B:
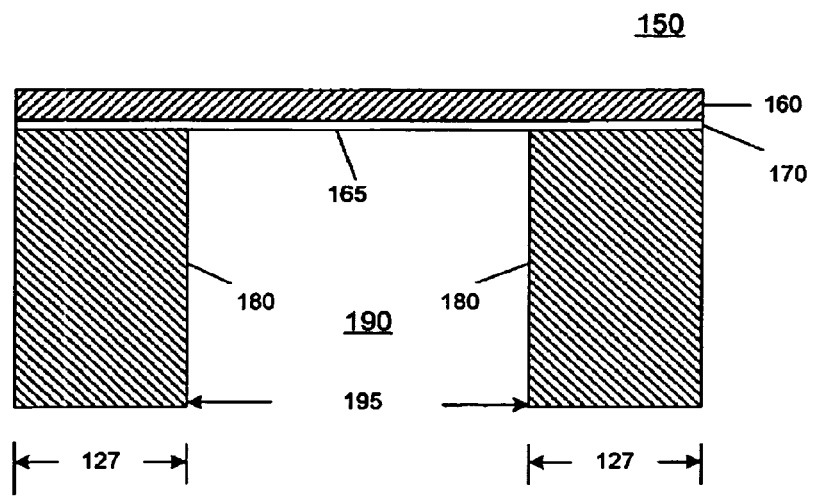
FIG. 1B is a cross-section of a pressure sensor in accordance with an embodiment of the present invention.

FIG. 1B is a cross-section of a pressure sensor in accordance with and embodiment of the present invention. This pressure sensor includes a diaphragm 165 supported by a frame 180. This figure, as with all the included figures, is shown for explanatory purposes only, and does not limit either the claims or the possible embodiments of the present invention.

As can be seen, the walls of the frame 180 are substantially vertical. In a specific embodiment of the present invention, the interior wall of the backside cavity 190, that is, the interior wall of the frame 180, is made vertical by etching the backside cavity 190 using a deep reactive ion etch (DRIE) process. In other embodiments, other MEMS micro-machining techniques are used, for example, Ion Milling. Alternately, other silicon etches that provide substantially vertical sidewalls may be used. The term DRIE as used herein refers to Deep Ion Etching with high aspect ratio etch characteristics that provides substantially vertical walls. For example, these walls may be within 1 to 3 degrees of vertical depending on the speed of the etch and the exact equipment and etch parameters such as gas mix. Alternately, the walls may be more than 3 degrees from vertical, or less than one degree from vertical, again depending on the above factors. Manufactures that provide plasma processing equipment that may be used include Surface Technology Systems located in Great Britain, Alcatel located in France, and Applied Materials located in California. The outer wall of the frame 180 is typically made vertical by sawing the wafer in order to separate individual die or pressure sensors from one another.

Using a deep reactive ion etch to form a vertical interior wall of the backside cavity 190 has at least two problems. The first problem is the control of the thickness of the diaphragm 165. The DRIE process etches near vertical walls at a rate that is typically between three microns per minute to currently as high as 20 microns per minute. The uniformity of this etch is typically plus or minus 5 percent. When applied to a 410 micron thick wafer where the desired diaphragm thickness is 10 microns, this tolerance leads to a 300 percent variation in diaphragm thickness.

To solve this, a specific embodiment of the present invention employees an insulator layer 170 between a first silicon layer 160 and a second silicon layer which forms the frame 180. As the DRIE process etches the backside cavity 190, the etching slows dramatically when the insulator layer 170 is reached. Thus, after DRIE etching, each diaphragm on a wafer has a thickness that is approximately equal to the thickness of the first silicon layer 160 and insulator layer 170.

The second problem associated with DRIE etching is its cost. Accordingly, an embodiment of the present invention provides a small enough die such that the X-Y array of sensors on a wafer is dense enough that the use of the DRIE process becomes cost effective.

The DRIE process has a fixed cost per wafer etched. This cost is independent of the amount of silicon to be removed, that is, the number of backside cavities 190 that are to be etched. The cost is the same whether one backside cavity is etched or over 20,000 backside cavities on a 150 mm (6 inch) wafer are etched. As an example, if the DRIE machine costs $1,000,000 and is depreciated over 5 years, and if an equal amount of support is needed, there is a $400,000 cost to operate the DRIE machine per year. Since there are roughly 8500 hours per year, this cost per hour is approximately $50. Given a 40 minute etch and a 5 minute load time, the per-wafer cost is $37.50, if the etcher is fully loaded and down time is minimized. This is comparable to what standard KOH etching costs, and results in a total cost per die of approximately $0.0015. This cost reduction is somewhat offset by the use of starting material including the insulating layer 170. Typically, SOI material is three times more expensive than standard silicon, but this is mitigated by dividing this cost among the large number of die per wafer afforded by embodiments of the present invention. One skilled in the art will appreciate that these costs and times will vary as the relevant technology inevitably moves forward, the examples given here are indicative of the benefits conveyed by embodiments of the present invention at the current time.

In a specific embodiment of the present invention, the length of the diaphragm is less than 350 microns, and it accounts for more than 10 percent of the total die area. This efficient use of die area helps make the manufacture of these sensors cost effective at a wafer level.

The vertical wall structure afforded by an embodiment of the present invention provides a further advantage in that it reduces a common mode signal generated by a force applied simultaneously at the bottom and top of diaphragm 165. Specifically, if a force is applied to the bottom and top of diaphragm 165, the resulting stress lines tend to be parallel to the diaphragm and at right angles to the frame walls. The result is that there is little or no piezoresistive effects induced on resistors that may be implanted or diffused in diaphragm 165. Also, any changes in capacitance of a capacitive sensor, where one plate of a capacitor is formed on the diaphragm 165, are similarly reduced, though other problems, such as transducing the nonlinear plate deflection arise, some of which can be mitigated by adding a boss to the diaphragm.

Figure 2A:
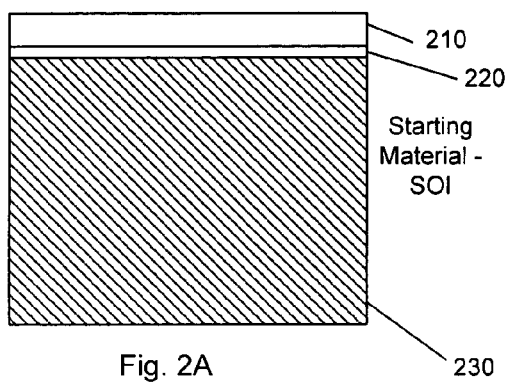
Figure 2D:
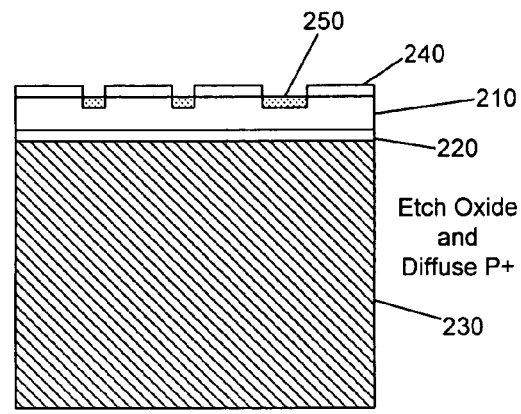
Figure 2B:
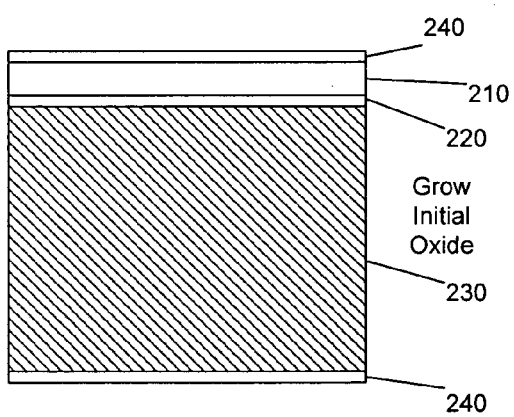
Figure 2E:
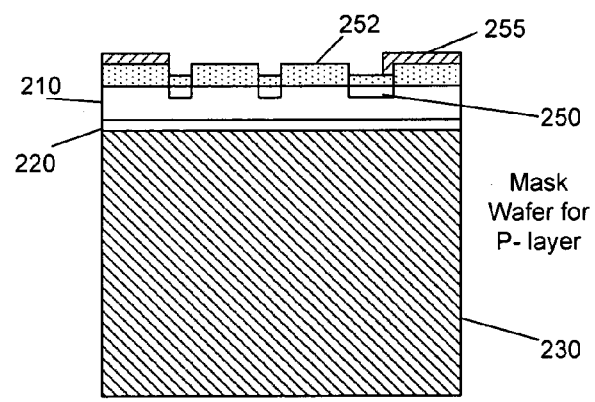
Figure 2C:
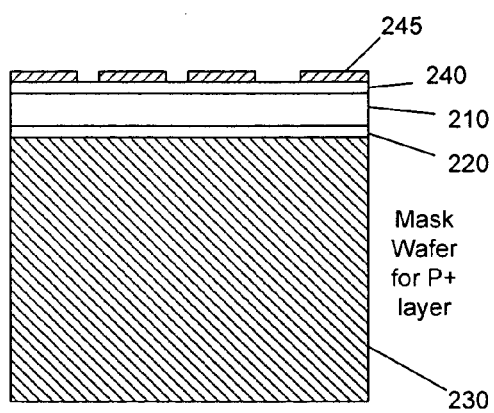

FIGS. 2A–2J illustrate steps that may be followed in manufacturing a pressure sensor 200 consistent with an embodiment of the present invention. In FIG. 2A, a silicon-on-insulator starting material is provided. This material includes an insulator layer 220 sandwiched between a first silicon layer 210 and a second silicon layer 230. One embodiment of the present invention uses starting material where the first silicon layer 210 is approximately between 5 to 9 microns thick. The first silicon layer 210 may be as thick as 15 microns for a "150 PSI" part, or thicker than 15 microns for higher pressures. This starting material also has an insulator layer 220 made of silicon dioxide that is approximately 2500 Angstroms thick, and a second silicon layer 230 that is approximately 400 microns thick. Both sides of the starting material are optically polished. In FIG. 2B, an oxide layer 240 is grown on the top and bottom surfaces of the wafer. In FIG. 2C a resist layer 245 is deposited on the wafer and patterned. In FIG. 2D, the oxide is etched and p+ regions 250 are diffused into the first silicon layer 210. Again, a resist layer 255 is deposited on the wafer and etched to form opening 252 in FIG. 2E.

Figure 2F:
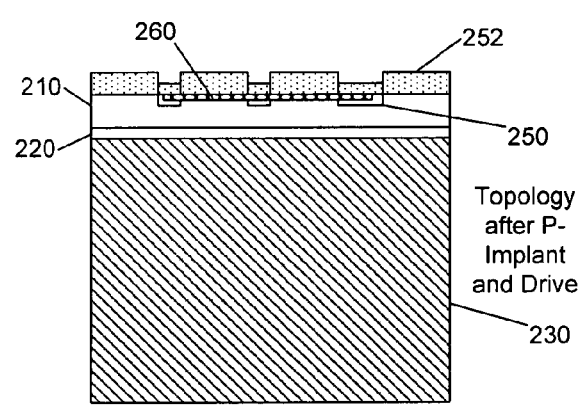

In FIG. 2F, p− regions 260 are implanted through the oxide into the first silicon layer 210. The p+ 250 and p− 260 regions form piezoresistive sensing resistors that may be configured as a Wheatstone bridge or other configuration in order to generate a signal that is proportional to differential pressure across the diaphragm. Alternately, the resistors may be eliminated, and a cap may be placed over the diaphragm. First and second electrodes are then placed on the diaphragm and inside portion of the cap. As the diaphragm is deflected due to an applied pressure, the distance, and thus the capacitance between the electrodes changes.

Figure 2G:
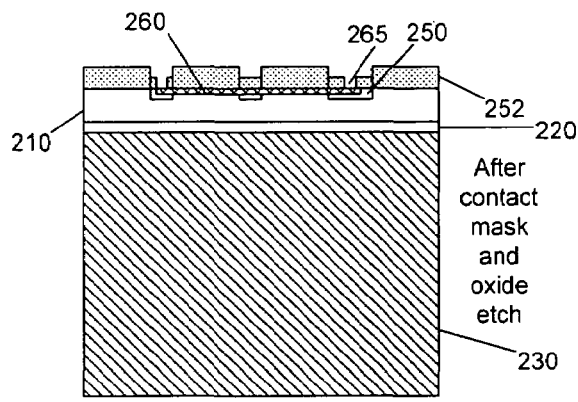
FIGS. 2G–2J illustrate the steps that may be followed in completing the manufacturing of a pressure sensor in accordance with an embodiment of the present invention.
Figure 2H:
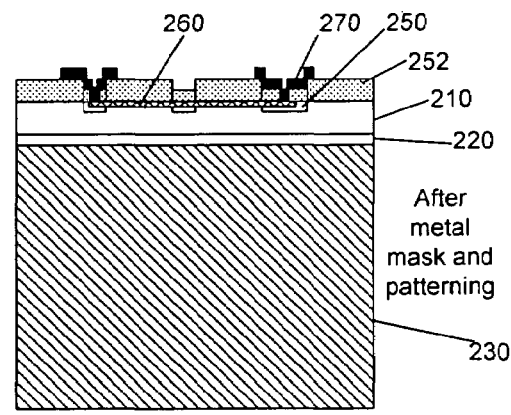
Figure 2I:
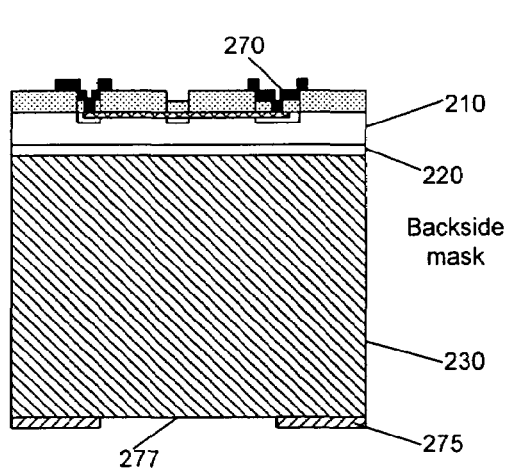
Figure 2J:
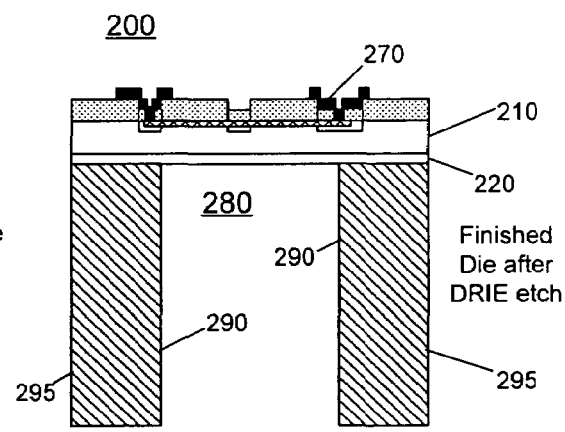

In FIG. 2G, a contact mask is used open areas for contacts 265. Metal 270 is deposited and etched as shown in FIG. 2H. In FIG. 2I, a backside mask is aligned using front-to-back alignment, such as by using infrared light, and the backside oxide 275 is selectively etched or patterned to form opening 277, which is an exposed silicon or no (or little) oxide area. In FIG. 2J, DRIE processing is used to etch through the second silicon layer from the opening in the oxide 277 to the insulator layer 220. In this way, the backside cavity 280 surrounded by substantially vertical—that is, orthogonal to the diaphragm—interior wall 290 of frame 295 is formed.

At this point the sensitivity of the sensor may be adjusted. For example, the insulating layer 220, which may be referred to as a buried insulating layer, above the cavity 280 may be thinned. Further adjustment may be made by removing this portion of the insulating layer. Even further adjustment may be made by thinning the resulting diaphragm, which at this point is made primarily of the first silicon layer 210.

FIGS. 3A–3D illustrate steps that may be followed in manufacturing either an absolute or gauge sensor in accordance with an embodiment of the present invention. To make the structure shown in FIG. 3A, the steps illustrated in FIGS. 2A–2F have been followed. Additionally, an oxide has been grown on the backside of the wafer, the oxide etched, and DRIE etching has been used to remove silicon to form the backside cavity 380.

In FIG. 3B, a second silicon wafer, glass, or other block 397 is attached to the bottom of the pressure sensor 300. In a specific embodiment, a second silicon wafer is attached to the bottom of the silicon wafer containing a number of sensors. For example, there may be 20,000 or more sensors on a 6 inch wafer. The second silicon wafer may be referred to as a constraint wafer. The frame 395 and block 397 may be fusion bonded, or otherwise affixed, such that a hermetic seal around backside cavity 380 is formed.

It should be noted that during high-temperature fusion bonding, trapped gas (or vacuum) in the cavity leads to a differential pressure across the diaphragm. This pressure may result in a plastically deformed diaphragm if the diaphragm is sufficiently thin. This is avoided by one embodiment of the present invention by sealing the cavity in a vacuum and doing the high temperature fusion in a low pressure furnace tube.

If the block 397 is glass or other material that is permeable to gas such as Helium, a metal or other protective layer may be placed over the backside opening 382. More detailed examples of this can be found in U.S. Pat. No. 6,4673,543, titled "Pressure Sensor Having a Silicon and Metal Defined Reference Chamber for Reduced Leakage," by Allen, which is hereby incorporated by reference. In FIG. 3C, metal 370 has been deposited and patterned forming contacts for the resistors 365. At this time, the sensors may be separated, for instance by sawing, resulting in a number of absolute sensors.

If the sensors are individualized at this point, the result is an absolute pressure sensor having a diaphragm 385 supported by a frame 395. The frame 395 wraps around a backside cavity 380 having an interior sidewall 390. This interior sidewall 390 is substantially vertical or orthogonal to the diaphragm 385. The diaphragm 385 is formed by a first silicon layer 310 and insulator layer 320, while the frame 395 is formed from an etched second silicon layer. The frame is also attached to a block 397.

This structure may be further processed in order to make a gauge sensor. For example, in FIG. 3D, an oxide layer is grown on the bottom of the second wafer 397, the oxide layer is patterned and etched, and DRIE etch processing is used to open a hole 399 through the second wafer 397. In this case, the insulator layer 320 blocks the DRIE etch after the hole 399 is opened in the second silicon wafer 397.

These sensors may be individualized at this point. The result is a gauge wafer having a diaphragm 385 supported by frame 395. The frame wraps around a backside cavity 380 having an interior sidewall 390. The interior sidewall 390 is substantially vertical or orthogonal to the diaphragm 385. The diaphragm 385 is formed by a first silicon layer 310 and insulator layer 320, while the frame 395 is formed from an etched second silicon layer. The frame is also attached to a block 397, which has a hole 399 leading to the backside cavity 380. The hole 399, like the backside cavity 380, typically has a substantially vertical inner wall, that is a wall that is substantially vertical to the diaphragm.

The use of block 397 isolates the die from the environment that is being measured. Also, the hole 399 can be smaller than the opening 382 to the backside cavity 380. This provides important advantages over mechanical ultrasonic drilling in that the cost of drilling holes over a large array becomes prohibitive and is limited in size to approximately between 300 and 500 microns. Block 397 also provides mechanical support to the sensor structure.

FIGS. 4A–4D illustrate patterns that may be used in etching a backside cavity. These patterns are used to form the areas where oxide is removed, such as 277 in FIG. 2, before a DRIE etch is performed. These shapes thus dictate the shape of the backside opening, cavity, interior wall, and diaphragm.

FIG. 4A illustrates a conventional square back-etch pattern that may be used for the shape of a backside opening and cavity. One drawback of this shape is that structural cracks or breaks may form approximately along line 410, since physical stress tends to accumulate in the corners of the square.

FIG. 4B illustrates a circular backside opening and cavity. Here, stress is evenly distributed in all directions along lines 420 and 425. Accordingly, this structure reduces the cracking associated with the square pattern of FIG. 4A. However, since the piezoresistive elements tend to be placed in positions such as 430, the stress lines 425 between them do not contribute to a pressure sensing output signal. Accordingly, the gain of the sensor, that is the change in resistance as a function of change in pressure, is reduced for the circular diaphragm as compared to the square.

FIG. 4C illustrates a compromise between the square of FIG. 4A and circle of FIG. 4B. This shape may be referred to as a rounded square. Alternately, the width and length of the pattern may be different, resulting in a rounded-rectangular shape. Here, the strongest stress lines 420 are applied in the direction of the resistors 430, while the stress along lines 425 between the resistors is reduced. A specific embodiment of the present invention uses a rounded shape where each rounded corner accounts for approximately 25 percent of the edge. In other embodiments, this may be more pronounced, for example, at least 25 percent of the edge may be used by each curve, or at least 33 percent of the edge may be used by each curve.

This shape has a further advantage in that the sensors are shipped in packaging tape and are removed from this packaging tape by pushpins. This removal is made easier by the larger silicon area of FIG. 4C as compared to the square backside cavity and opening of FIG. 4A. This shape also provides additional space for topside bond pads as compared to the square backside.

FIG. 4D illustrates a castle shape that may be used to as an alternate back etch pattern according to an embodiment of the present invention. This shape results in a further reduction in the amount of stress along lines 425 between resistors 430. Other examples can be found in U.S. Pat. No. 6,089,099, titled "Method for Forming a Bonded Silicon-Glass Pressure Sensor With Strengthened Corners," by Sathe, which is incorporated by reference.

FIGS. 5A–5D illustrate steps that may be used in forming a backside cavity and diaphragm having a boss in accordance with an embodiment of the present invention. FIG. 5A illustrates a starting material including a first silicon layer 510, an insulating layer 520, and second silicon layer 530 where the oxide layer 540 has been patterned and an selectively thinned or etched resulting a thin oxide layer area 550. The thin oxide layer area 550 is further etched such that the oxide is completely or substantial removed from areas 560 as shown in FIG. 5B, thus exposing the silicon above area 560.

The backside is DRIE etched as shown in FIG. 5C. The silicon above areas 560 where the oxide was removed etch faster, resulting in notches 570. When the thin oxide area 550 is consumed etched, or otherwise removed, the backside silicon and is etched above area 550 as well as in notches 570. The result is that the silicon above the thin oxide area 550—which been protected for parts of the DIRE etch—remain and forms boss 580, while the areas 590 are etched at least substantially close to the insulator layer 520, as shown in FIG. 5D. The areas 590 are bounded by an interior sidewall of the cavity, and the sidewall is substantially orthogonal to the diaphragm. Stated another way, if the diaphragm is oriented in a horizontal position, the sidewall is substantially vertical. The boss 580 strengthens the diaphragm above its such that the stress is localized at areas 590. This results in increasing the gain, that is the change in resistance per change in pressure, for the sensor.

After the DRIE etch has been done, there may be a beak (as in "bird's beak") remaining on the resulting boss 580. This beak may be in the form of a rim 1–5 microns in length and projecting down from the edge of the boss 580 along 590 towards the bottom of the original silicon layer. A KOH etch tends to etch fastest around a non <111> crystal region such as this beak. Since the beak is relatively short and quickly etched, it may be removed using a KOH or other non-selective etch without significantly etching the other features of the pressure sensor.

Figure 5E:
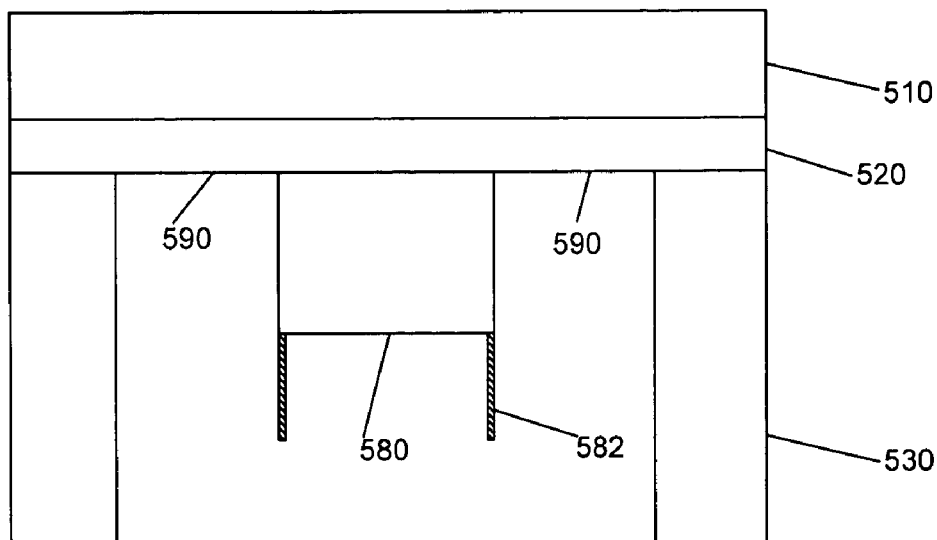
Figure 5F:
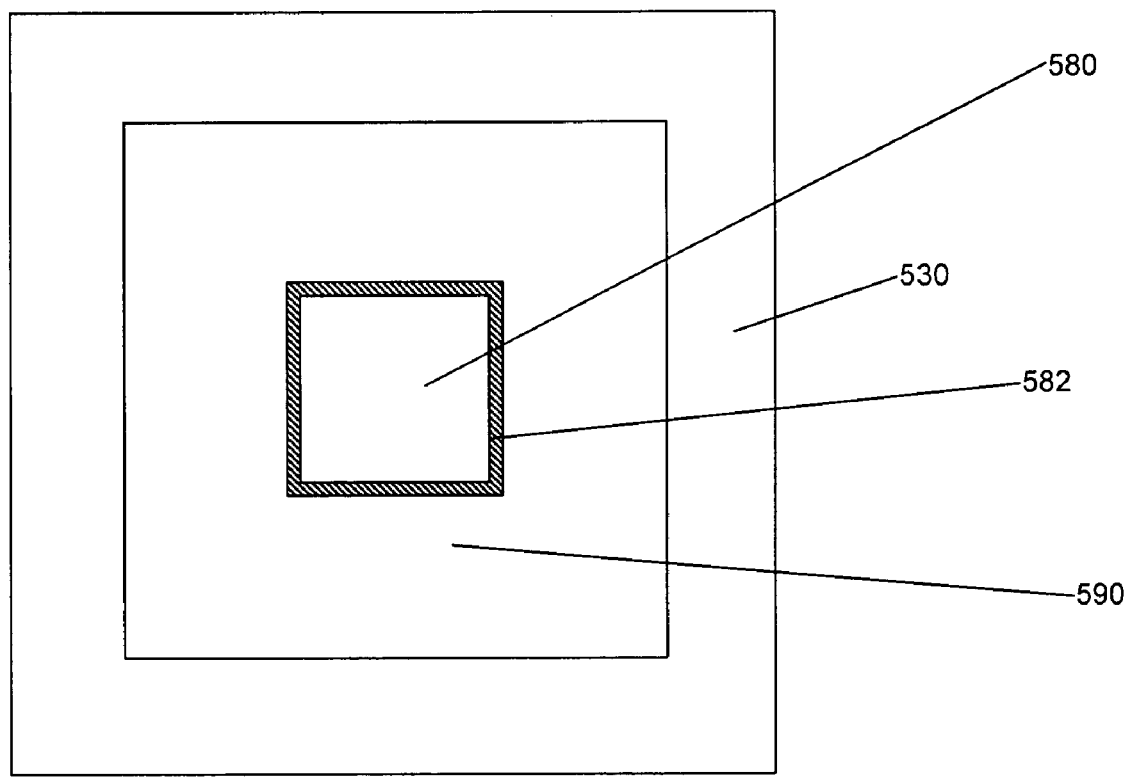

FIG. 5E illustrates a side view of a pressure sensor having a diaphragm with a boss 580 according to an embodiment of the present invention, where the boss 580 has a residual beak 582 following a DRIE etch. Again, this beak 582 may be removed using a non-selective etch such as a KOH etch. The resulting boss 580 may have rounded corners following this etch. FIG. 5F is a bottom view of the pressure sensor of FIG. 5F for a square backside cavity.

This two step approach, that is etching the second silicon layer 530 above area 560 to form the notch (or ring) 570 before etching the second silicon layer 530 above area 550, allows for the formation of a boss that has a thickness that is independent on the thickness of the second silicon layer 530. One specific embodiment of the present invention uses a boss having a thickness approximately equal to 5 times the thickness of the diaphragm. In this case, the boss is rigid compared to the diaphragm, and secondary deflection is greatly reduced.

It will be appreciated by one skilled in the art that the process steps shown in this and other figures may be modified without departure from the present invention. For example, in one embodiment, the oxide layer 540 is grown as shown in FIG. 5A. The oxide layer is coated with nitride and then etched in area 550. The oxide is then removed in area 560 as shown in FIG. 5B, and the process continues as described above.

Figure 6A:
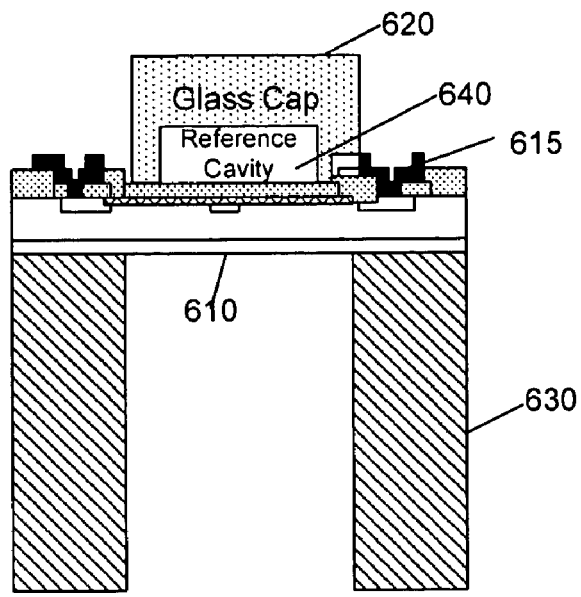
FIGS. 6A and 6B illustrate backside absolute pressure sensors in accordance with an embodiment of the present invention.
Figure 6B:
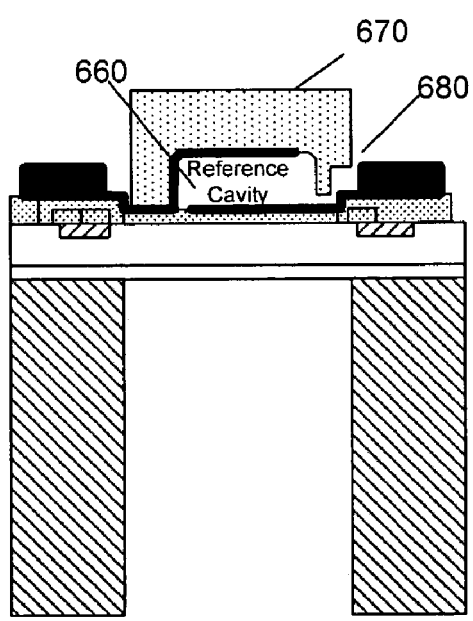

FIGS. 6A and 6B illustrate backside absolute pressure sensors in accordance with an embodiment of the present invention. In FIG. 6A, pressure sensor 600 includes a diaphragm 610 supported by frame 630 and covered by cap 620. This cap 620 creates a reference cavity 640. In this way an absolute reference cavity is formed at the top side of the diaphragm. This is useful, for example, in harsh environments.

In a specific embodiment, the cap is formed of glass and is sealed forming a reference cavity 640 by anodic bonding of the glass to either silicon or silicon oxide. Alternately, fusion bonding may also be done using a thin silicon cap with the cap recessed in the cavity slightly larger than the diaphragm. In a specific embodiment, the pads 615 are exposed by dicing through the glass. The reference cavity is typically 5 to 15 microns in depth.

FIG. 6B illustrates a sensor 650 having a topside vented cavity 660 formed by anodic bonding of a glass cap 670 to either silicon or silicon oxide. This sensor is a capacitive sensor, where the reference cavity is typically between 1 and 3 microns in depth. In the pressure sensor shown, an optional vent 680 is included. In other embodiments, the reference cavity 660 may be hermetically sealed.

Figure 7:
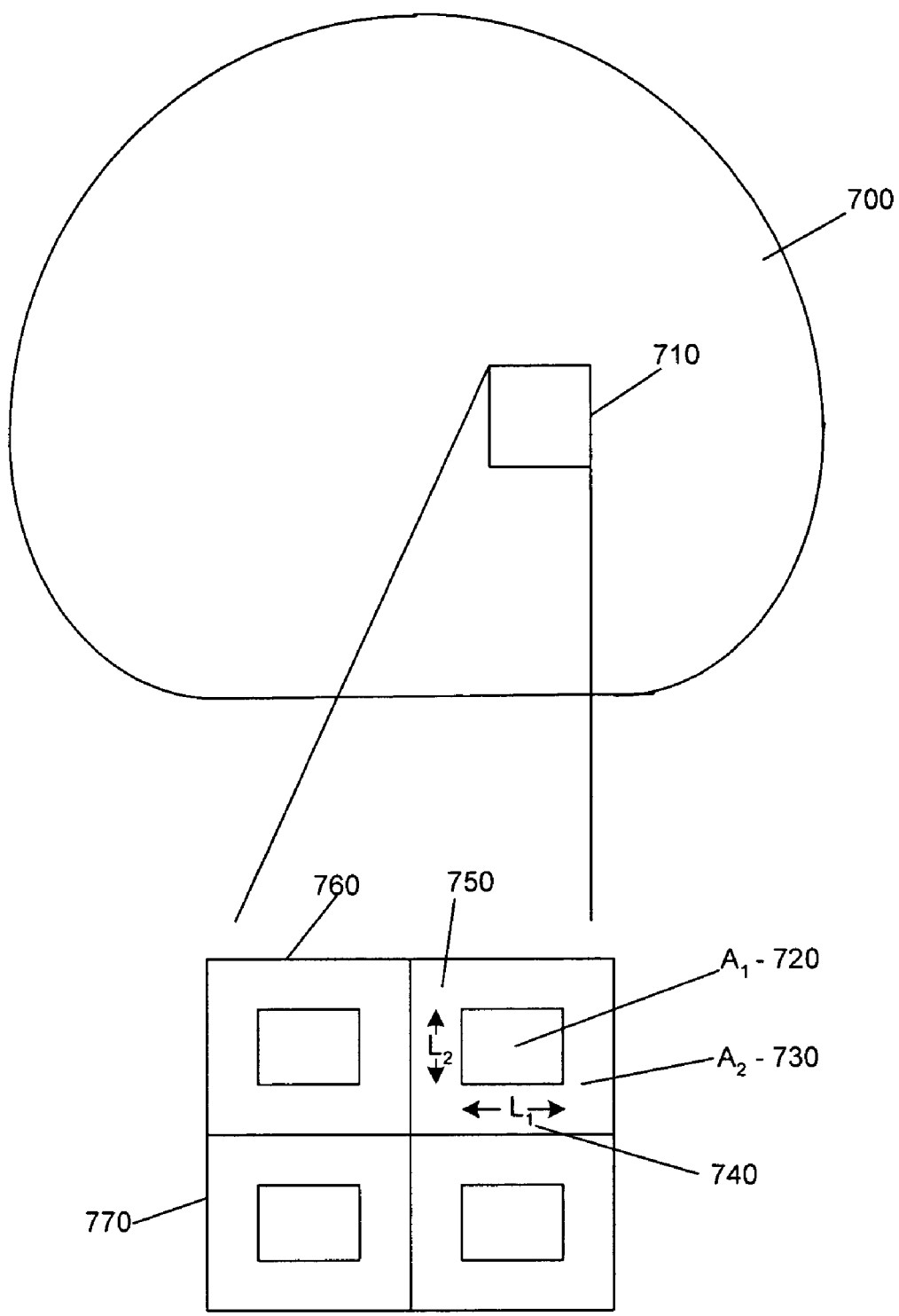
FIG. 7 illustrates a silicon wafer in accordance with an embodiment of the present invention.

FIG. 7 illustrates a silicon wafer in accordance with an embodiment of the present invention. Wafer 700 includes a wafer portion 710 shown enlarged for clarity that includes a number of pressure sensors 760. Again, on a 150 mm (6 inch) wafer an embodiment of the present invention provides approximately at least 20,000 pressure sensors. Another embodiment of the present invention provides over 25,000 pressure sensors on the same size wafer. One specific embodiment provides approximately over 19,000 pressure sensors on a 6 inch wafer, each pressure sensor having a diaphragm of 350 microns or less in length. Another specific embodiment provides over 25,000 pressure sensors on a 6 inch wafer, each pressure sensor having a diaphragm of 250 microns or less in length. Yet another specific embodiment provides over 30,000 pressure sensors on an 8 inch wafer, each pressure sensor having a diaphragm of 350 microns or less in length. Still another specific embodiment provides over 40,000 pressure sensors on an 8 inch wafer, each pressure sensor having a diaphragm of 250 microns or less in length. It will be appreciated by one skilled in the art that larger wafers consistent with an embodiment of the present invention provide more pressure sensors, while smaller wafers provide fewer. It will also be appreciated that the terms 150 mm, 6, and 8 inch wafers refer to industry standard sized wafers, and that such wafer may not be exactly 150 mm, 6, or 8 inches in diameter.

Each of the pressure sensors 760 has a total die area A2 730 and includes a diaphragm having area A1 720. The diaphragm has a length L1 740 and a length L2 750. A specific embodiment of the present invention has a length L1 740 and a length L2 750 that are each less than 350 microns. Further, the ratio of A2 730 to a A1 720 is less than 10. This means that of the total wafer area, at least approximately 10 percent of it are pressure sensor diaphragms. Another embodiment of the present invention has a length L1 740 and a length L2 750 that are each less than 250 microns.

After manufacturing, the wafer 700 is scribed or sawed along lines 770 such that he pressure sensors are individualized. Wafer 700 also typically includes PCM and other test die patterns that are spaced regularly among the pressure sensors.

The foregoing description of specific embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A pressure sensor comprising:
    a diaphragm and a sidewall, the sidewall having an interior side defining a backside cavity, the backside cavity extending from a portion of an insulator layer directly in contact with the diaphragm to a backside opening,
    wherein the interior side of the sidewall is formed using a deep reactive ion etch and is substantially orthogonal to the diaphragm,
    wherein the deep reactive ion etch begins at the backside opening and etches towards the diaphragm at a rate that is substantially reduced when the insulator layer is reached, and
    wherein the backside opening is non-rectangular.

2. The pressure sensor of claim 1 wherein the backside opening forms a rounded square.

3. The pressure sensor of claim 1 wherein the backside opening is shaped as a castle.

4. An absolute pressure sensor comprising:
a first silicon layer comprising a diaphragm having a top and a bottom;
an insulator layer covering the bottom of the diaphragm; and
a second silicon layer below the insulator layer and comprising a sidewall extending from the insulator layer on the bottom of the diaphragm, the sidewall having an interior side forming a backside cavity having a backside opening, the interior side substantially orthogonal to the diaphragm; and
a block covering the backside opening such that a hermetic seal is formed.

5. The absolute pressure sensor of claim 4 wherein the block is silicon.

6. The absolute pressure sensor of claim 4 wherein the block is glass.

7. An absolute pressure sensor comprising:
a diaphragm having a top and a bottom;
a sidewall extending from the bottom of the diaphragm, the sidewall having an interior side forming a backside cavity having a backside opening, the interior side substantially orthogonal to the diaphragm; and
a block covering the backside opening such that a hermetic seal is formed,
wherein the block is glass, and
wherein the glass block is covered with metal over the backside opening.

8. A silicon wafer comprising:
a plurality of pressure sensors, each pressure sensor comprising:
a diaphragm having a top and a bottom; and
a sidewall extending from the bottom of the diaphragm, the sidewall having an interior side formed using a deep reactive ion etch and forming a backside cavity having a backside opening, the interior side substantially orthogonal to the diaphragm,
wherein the plurality of pressure sensors includes approximately at least twenty-thousand pressure sensors,
and wherein the silicon wafer is a 150 mm (6 inch) wafer.

9. A pressure sensor apparatus comprising:
exactly one pressure sensor in a housing, the exactly one pressure sensor comprising:
a diaphragm having a top and a bottom; and
a sidewall extending from the bottom of the diaphragm, the sidewall having an interior side formed using a deep reactive ion etch and forming a backside cavity having a backside opening, the interior side substantially orthogonal to the diaphragm,
wherein the diaphragm is less than 350 microns in length, and
the diaphragm accounts for more than 10 percent of an area of the exactly one pressure sensor.

10. A pressure sensor comprising:
a diaphragm having a top and a bottom;
a sidewall extending from the bottom of the diaphragm, the sidewall having an interior side forming a backside cavity having a backside opening, the interior side substantially orthogonal to the diaphragm;
a cap attached to the top of the diaphragm;
a first electrode attached to the top of the diaphragm; and
a second electrode attached to an underside of the cap,
wherein the cap and diaphragm form a reference cavity, and
wherein the first electrode and the second electrode form a capacitor.

11. A pressure sensor comprising:
a diaphragm having a top and a bottom;
a sidewall extending from the bottom of the diaphragm, the sidewall having an interior side forming a backside cavity having a backside opening, the interior side substantially orthogonal to the diaphragm;
a cap attached to the top of the diaphragm;
a plurality of resistors in the top of the diaphragm,
wherein the cap and diaphragm form a reference cavity, and
wherein the plurality of resistors form a piezoresistive sensing circuit.

12. A pressure sensor comprising:
a first silicon layer comprising a diaphragm;
an insulator layer below the first silicon layer;
a second silicon layer below the insulator layer and having a backside cavity defined by a sidewall, a backside opening, and a portion of the insulator layer below and directly in contact with the diaphragm,
wherein the backside cavity is formed using a deep reactive ion etch and the sidewall is substantially orthogonal to the diaphragm,
wherein the backside opening is non-rectangular.

13. The pressure sensor of claim 12 wherein the backside opening forms a rounded square.

14. The pressure sensor of claim 12 wherein the backside opening is shaped as a castle.

15. The pressure sensor of claim 12 further comprising:
a block covering the backside opening such that a hermetic seal is formed.

16. The pressure sensor of claim 15 wherein the block is silicon.

17. The pressure sensor of claim 15 wherein the block is glass.

18. The pressure sensor of claim 17 wherein the glass block is covered with metal over the backside opening.

19. A pressure sensor comprising:
a first silicon layer having a top side and a bottom side and comprising a diaphragm;
an insulator layer having a top side and a bottom side, the top side in contact with the bottom side of the first silicon layer;
a second silicon layer having a top side and a bottom side, the top side in contact with the bottom side of the insulator layer and having a backside cavity defined by a sidewall, a portion of the bottom side of the insulator layer, and a backside opening in the bottom side of the second silicon layer,
wherein the backside cavity is formed using a deep reactive ion etch and the sidewall is substantially orthogonal to the diaphragm.

20. The pressure sensor of claim 19 wherein the backside opening forms a rounded square.

21. The pressure sensor of claim 19 wherein the backside opening is shaped as a castle.

22. The pressure sensor of claim 19 further comprising:
a block covering the backside opening such that a hermetic seal is formed.

23. The pressure sensor of claim 22 wherein the block is silicon.

24. The pressure sensor of claim 22 wherein the block is glass.

25. The pressure sensor of claim 24 wherein the glass block is covered with metal over the backside opening.

* * * * *